(12) United States Patent
Lee et al.

(10) Patent No.: US 12,154,302 B2
(45) Date of Patent: Nov. 26, 2024

(54) METHOD, APPARATUS AND STORAGE MEDIUM FOR IMAGE ENCODING/DECODING USING BINARY MASK

(71) Applicant: Electronics and Telecommunications Research Institute, Daejeon (KR)

(72) Inventors: Joo-Young Lee, Daejeon (KR); Se-Yoon Jeong, Daejeon (KR); Hyoung-Jin Kwon, Daejeon (KR); Dong-Hyun Kim, Daejeon (KR); Youn-Hee Kim, Daejeon (KR); Jong-Ho Kim, Daejeon (KR); Ji-Hoon Do, Daejeon (KR); Jin-Soo Choi, Daejeon (KR); Tae-Jin Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 308 days.

(21) Appl. No.: 17/542,002

(22) Filed: Dec. 3, 2021

(65) Prior Publication Data

US 2022/0180569 A1 Jun. 9, 2022

(30) Foreign Application Priority Data

Dec. 4, 2020 (KR) .................. 10-2020-0168927
Nov. 29, 2021 (KR) .................. 10-2021-0166377

(51) Int. Cl.
*G06T 9/00* (2006.01)

(52) U.S. Cl.
CPC .................. *G06T 9/002* (2013.01)

(58) Field of Classification Search
CPC ........ G06T 9/002; H04N 19/91; H04N 19/60; H04N 19/13; H04N 19/184; H04N 19/467; G06N 3/04; G06N 3/08
See application file for complete search history.

(56) References Cited

U.S. PATENT DOCUMENTS 7,110,596 B2 * 9/2006 Simard ................ G06V 30/162
382/243
10,841,577 B2 * 11/2020 Cho ..................... H04N 19/109
(Continued)

FOREIGN PATENT DOCUMENTS

KR 10-2020-0035879 A 4/2020
KR 1020200049451 A 5/2020

OTHER PUBLICATIONS

Lee, Jooyoung, Seunghyun Cho, and Seung-Kwon Beack. "Context-adaptive entropy model for end-to-end optimized image compression." arXiv preprint arXiv:1809.10452 (2018). (Year: 2018).*
(Continued)

*Primary Examiner* — Andrae S Allison
(74) *Attorney, Agent, or Firm* — Sughrue Mion, PLLC

(57) ABSTRACT

Disclosed herein are a method, an apparatus and a storage medium for image encoding/decoding using a binary mask. An encoding method includes generating a latent vector using an input image, generating a selected latent vector component set using a binary mask, and generating a main bitstream by performing entropy encoding on the selected latent vector component set. A decoding method includes generating a selected latent vector component set including one or more selected latent vector components by performing entropy decoding on a main bitstream and generating the latent vector in which the one or more selected latent vector components are relocated by relocating the selected latent vector component set in the latent vector.

20 Claims, 10 Drawing Sheets

(56) References Cited

U.S. PATENT DOCUMENTS

| | | | |
|---|---|---|---|
| 11,100,352 B2* | 8/2021 | Lee .................. | G06V 10/82 |
| 11,314,982 B2* | 4/2022 | Price ................ | G06N 3/045 |
| 2008/0144952 A1* | 6/2008 | Chen ................ | H04N 19/93 |
| | | | 375/E7.076 |
| 2020/0027247 A1* | 1/2020 | Minnen ............. | G06T 9/002 |
| 2020/0107023 A1 | 4/2020 | Lee et al. | |
| 2020/0351509 A1* | 11/2020 | Lee .................. | G06N 3/04 |
| 2022/0239933 A1* | 7/2022 | Lim ................. | H04N 19/172 |
| 2022/0279161 A1* | 9/2022 | Lim ................. | H04N 19/80 |
| 2022/0279183 A1* | 9/2022 | Besenbruch ....... | G06N 3/084 |

OTHER PUBLICATIONS

Li, Mu, et al. "Efficient and effective context-based convolutional entropy modeling for image compression." IEEE Transactions on Image Processing 29 (2020): 5900-5911. (Year: 2020).*

* cited by examiner

METHOD, APPARATUS AND STORAGE MEDIUM FOR IMAGE ENCODING/DECODING USING BINARY MASK

CROSS REFERENCE TO RELATED APPLICATIONS

This application claims the benefit of Korean Patent Application Nos. 10-2020-0168927, filed Dec. 4, 2020, and 10-2021-0166377, filed Nov. 29, 2021, which are hereby incorporated by reference in their entireties into this application.

BACKGROUND OF THE INVENTION

1. Technical Field

The present disclosure relates generally to a method, an apparatus and a storage medium for image encoding/decoding. More particularly, the present disclosure relates to a method, an apparatus and a storage medium for image encoding/decoding using a binary mask.

2. Description of the Related Art

Recently, Artificial Neural Networks (ANNs) have come to be used in various fields, and many breakthroughs have been achieved owing to the exceptional optimization and representation learning performance thereof.

Additionally, in image compression fields, image/video compression networks using ANNs have been developed and have rapidly improved from the standpoint of compression performance, thus exhibiting performance at a level similar to that of an existing codec.

Among image compression schemes using such ANNs, a scheme using an entropy model has recently been dominant.

An ANN for image compression based on an entropy model is composed of encoder/decoder networks and an entropy model for approximating the probability distribution of a transforming latent vector.

An input image is translated into the form of a latent vector through an encoder transform network, and the latent vector is translated into a reconstructed image through a decoder transform network.

The ANN for image compression based on an entropy model calculates a rate term using the entropy model for approximating the probability distribution of a transforming latent vector, and includes the calculated rate term in a loss function. Through the setting of this loss function, the entropy model is trained such that the latent vector has low entropy.

The trained entropy model is also used for probability estimation in the process for performing entropy encoding and entropy decoding on a transforming latent vector when inference is performed by ANNs as well as learning.

Much progress has been made on the development of an image compression scheme based on a conventional entropy model from the standpoint of performance, but computational complexity remains high compared to that of an existing codec for image compression.

SUMMARY OF THE INVENTION

An embodiment is intended to provide an apparatus, a method, and a storage medium for selecting latent vector components of a latent vector using a binary mask.

An embodiment is intended to provide an apparatus, a method, and a storage medium for performing encoding/decoding on a latent vector using distribution information of the latent vector.

In accordance with an aspect, there is provided an encoding method, including generating a latent vector using an input image; generating a selected latent vector component set using a binary mask; and generating a main bitstream by performing entropy encoding on the selected latent vector component set.

The encoding method may further include generating an additional bitstream by performing analysis and compression on the latent vector; and generating the binary mask using the additional bitstream.

The binary mask may include binary values respectively corresponding to latent vector components of the latent vector.

Each of the latent vector components of the latent vector may be one of a selected latent vector component and a redundant latent vector component.

The selected latent vector component may be a latent vector component that is selected using the binary mask.

The redundant latent vector component may be a latent vector component that is not selected using the binary mask.

The main bitstream may be generated by performing the entropy encoding on the selected latent vector component set using distribution information.

The distribution information may be used to calculate a symbol probability for the entropy encoding on the selected latent vector component set.

The distribution information may be a set of pairs of a mean and a standard deviation.

In accordance with another aspect, there is provided a decoding method, including generating a selected latent vector component set including one or more selected latent vector components by performing entropy decoding on a main bitstream; and generating a latent vector in which the one or more selected latent vector components are relocated by relocating the selected latent vector component set in the latent vector.

The decoding method may further include generating a binary mask using an additional bitstream.

Relocation of the selected latent vector component set in the latent vector is performed using the binary mask.

The selected latent vector components may be arranged at one or more corresponding positions in the latent vector using one or more active positions specified in the binary mask.

Distribution information of the latent vector may be generated using the additional bitstream.

The distribution information may be used to calculate a symbol probability for entropy decoding on one or more selected latent vector components of the selected latent vector component set.

The distribution information may be a set of pairs of a mean and a standard deviation.

Prediction of one or more redundant latent vector components of the latent vector may be performed using the distribution information.

The decoding method may further include generating a recombined latent vector by determining values of one or more redundant latent vector components of the latent vector; and generating a reconstructed image using the recombined latent vector.

The redundant latent vector components may be remaining latent vector components, other than the selected latent vector components, among all latent vector components of the latent vector.

A value of each of the one or more redundant latent vector components may be predicted using one or more latent vector components neighboring the corresponding redundant latent vector component.

A value of each of the one or more redundant latent vector components may be predicted using one or more relocated selected latent vector components neighboring the corresponding redundant latent vector component.

A value of each of the one or more redundant latent vector components may be predicted using interpolation for values of one or more latent vector components neighboring the corresponding redundant latent vector component.

A binary mask may be generated using an additional bitstream.

The additional bitstream may include one or more prediction values for the redundant latent vector components.

The one or more prediction values may be used as one or more values of the one or more redundant latent vector components, respectively.

A specific value may be used as values of the one or more redundant latent vector components.

In accordance with a further aspect, there is provided a computer-readable storage medium storing a bitstream for encoding, the bitstream including a main bitstream; and an additional bitstream, wherein a selected latent vector component set including one or more selected latent vector components is generated by performing entropy decoding on the main bitstream, a binary mask is generated using the additional bitstream, and a latent vector in which the one or more selected latent vector components are relocated is generated by relocating the selected latent vector component set in the latent vector using the binary mask.

In addition, there are provided other methods, apparatuses, and systems for implementing the present disclosure and a computer-readable storage medium storing a computer program for executing the methods.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
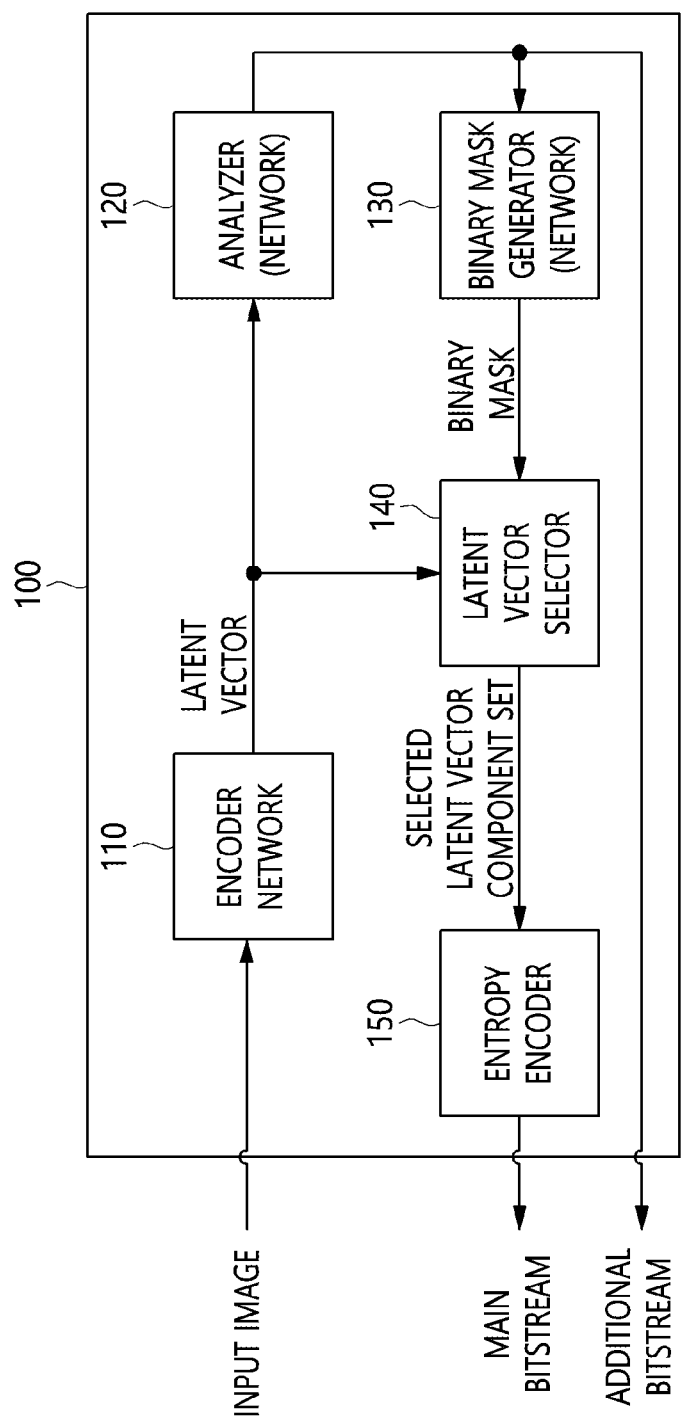
FIG. 1 illustrates an encoding apparatus according to an embodiment.

The present disclosure may have various changes and various embodiments, and specific embodiments will be illustrated in the attached drawings and described in detail below. However, this is not intended to limit the present disclosure to particular modes of practice, and it is to be appreciated that all changes, equivalents, and substitutes that do not depart from the spirit or technical scope of the present disclosure are encompassed in the present disclosure.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

In the present disclosure, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present disclosure. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification, as long as it does not depart from the essence of the present specification.

The terms used in embodiments are merely used to describe specific embodiments and are not intended to limit the present disclosure. A singular expression includes a plural expression unless a description to the contrary is specifically pointed out in context. In the embodiments, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, it should be noted that, in embodiments, an expression describing that a component "comprises" a specific component means that additional components may be included in the scope of the practice or the technical spirit of the embodiments, but do not preclude the presence of components other than the specific component.

In embodiments, the term "at least one" means one of numbers of 1 or more, such as 1, 2, 3, and 4. In the embodiments, the term "a plurality of" means one of numbers of 2 or more, such as 2, 3, or 4.

Some components in embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known functions and configurations which are deemed to make the gist of the present disclosure obscure will be omitted. It should be noted that the same reference numerals are used to designate the same or similar components throughout the drawings, and that descriptions of the same components will be omitted.

In the following embodiments, described is a method for utilizing only part of a latent vector transformed through an encoder neural network in artificial neural network technology for image compression, which includes the encoder neural network and a decoder neural network, thus reducing compression complexity and improving compression efficiency. The latent vector may be feature data.

In order to utilize only part of the transformed latent vector, a binary mask may be used. The binary mask may analyze the latent vector, and may transmit the latent vector in the form of additional information that is compressed.

FIG. 1 illustrates an encoding apparatus according to an embodiment.

An encoding apparatus 100 may include an encoder network 110, an analyzer 120, a binary mask generator 130, a latent vector selector 140, and an entropy encoder 150.

The analyzer 120 may be an analysis/compression network.

The binary mask generator 130 may be a binary mask generation/reconstruction network.

The functions and operations of the encoder network 110, the analyzer 120, the binary mask generator 130, the latent vector selector 140, and the entropy encoder 150 will be described in detail below.

Figure 2:
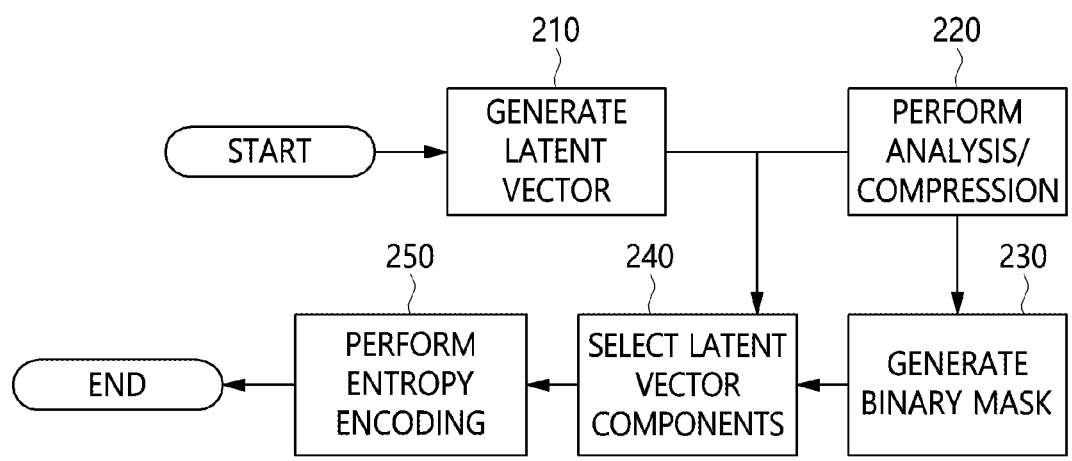
FIG. 2 is a flowchart of an encoding method according to an embodiment.

FIG. 2 is a flowchart of an encoding method according to an embodiment.

At step 210, the encoder network 110 may receive an input image.

The encoder network 110 may generate a latent vector using the input image.

For example, the encoder network 110 may extract the latent vector from the input image. Alternatively, the encoder network 110 may transform the input image into the latent vector.

At step 220, the analyzer 120 may generate an additional bitstream by performing analysis and compression on the latent vector.

When analysis and compression are performed on the latent vector, entropy encoding may be performed.

At step 230, the binary mask generator 130 may generate a binary mask using the additional bitstream.

In other words, the binary mask may be generated based on analysis of the latent vector.

The binary mask generator 130 may reconstruct the binary mask using the additional bitstream.

Upon reconstructing the binary mask, entropy decoding may be performed.

At step 240, the latent vector selector 140 may generate a selected latent vector component set from the latent vector using the binary mask.

The latent vector may include one or more latent vector components.

The selected latent vector component set may include one or more latent vector components. Alternatively, the selected latent vector component set may indicate a latent vector component.

The latent vector selector 140 may select latent vector components from the latent vector using the binary mask, and may generate a selected latent vector component set including the latent vector components selected using the binary mask.

At step 250, the entropy encoder 150 may generate a main bitstream by performing entropy encoding on the selected latent vector component set.

The entropy encoder 150 may generate an encoded selected latent vector component set by performing entropy encoding on the selected latent vector component set.

The main bitstream may include the encoded selected latent vector component set.

Figure 3:
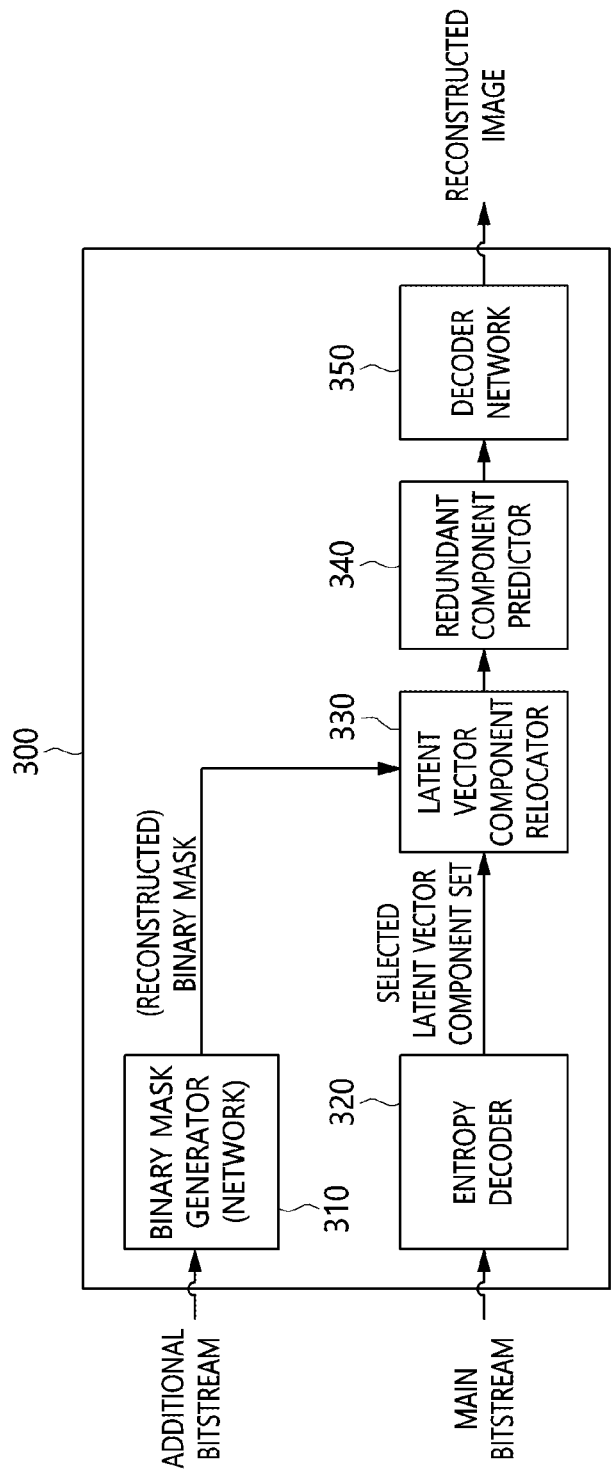
FIG. 3 illustrates a decoding apparatus according to an embodiment.

FIG. 3 illustrates a decoding apparatus according to an embodiment.

A decoding apparatus 300 may include a binary mask generator 310, an entropy decoder 320, a latent vector component relocator 330, a redundant component predictor 340, and a decoder network 350.

The binary mask generator 310 may be a binary mask reconstruction network.

The functions and operations of the binary mask generator 310, the entropy decoder 320, the latent vector component relocator 330, the redundant component predictor 340, and the decoder network 350 will be described in detail below.

Figure 4:
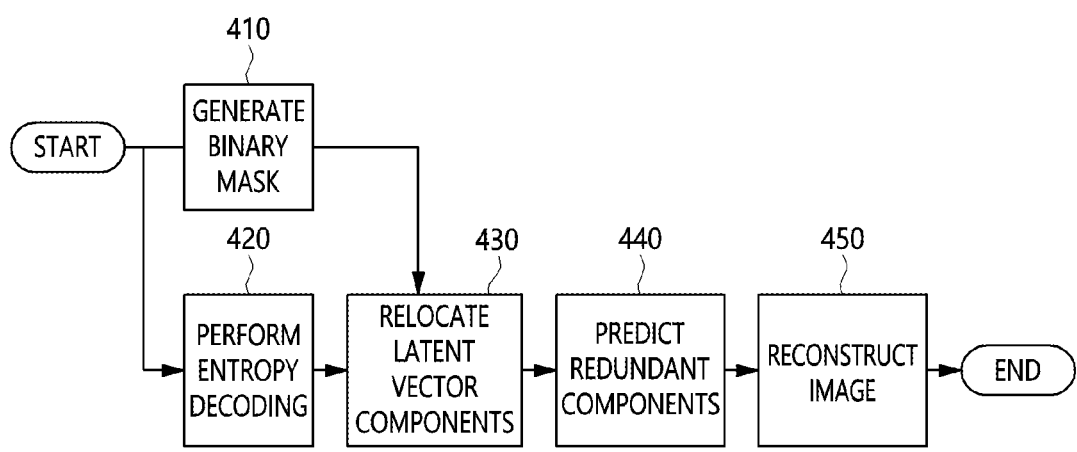
FIG. 4 is a flowchart of a decoding method according to an embodiment.

FIG. 4 is a flowchart of a decoding method according to an embodiment.

At step 410, the binary mask generator 310 may receive an additional bitstream.

The binary mask generator 310 may generate a binary mask using the additional bitstream.

The binary mask used in the encoding apparatus 100 may be reconstructed by the binary mask generator 310.

At step 420, the entropy decoder 320 may receive a main bitstream.

The entropy decoder 320 may generate one or more selected latent vector component sets by performing entropy decoding on the main bitstream.

The main bitstream may include encoded selected latent vector component sets.

The entropy decoder 320 may acquire the selected latent vector component sets by performing entropy decoding on the encoded selected latent vector component sets of the main bitstream.

At step 430, the latent vector component relocator 330 may generate a latent vector in which one or more selected latent vector components are relocated by relocating the selected latent vector component sets in the latent vector using the binary mask.

At step 440, the redundant component predictor 340 may generate a recombed latent vector by determining the values of one or more redundant latent vector components of the latent vector.

The redundant component predictor 340 may generate the recombined latent vector by performing prediction and combination on the redundant latent vector components of the latent vector.

Through the above-described relocation and prediction, the latent vector used in the encoding apparatus 100 may be reconstructed. In other words, the recombined latent vector may be the reconstructed latent vector.

At step 450, the decoder network 350 may generate a reconstructed image using the recombined latent vector.

Figure 5:
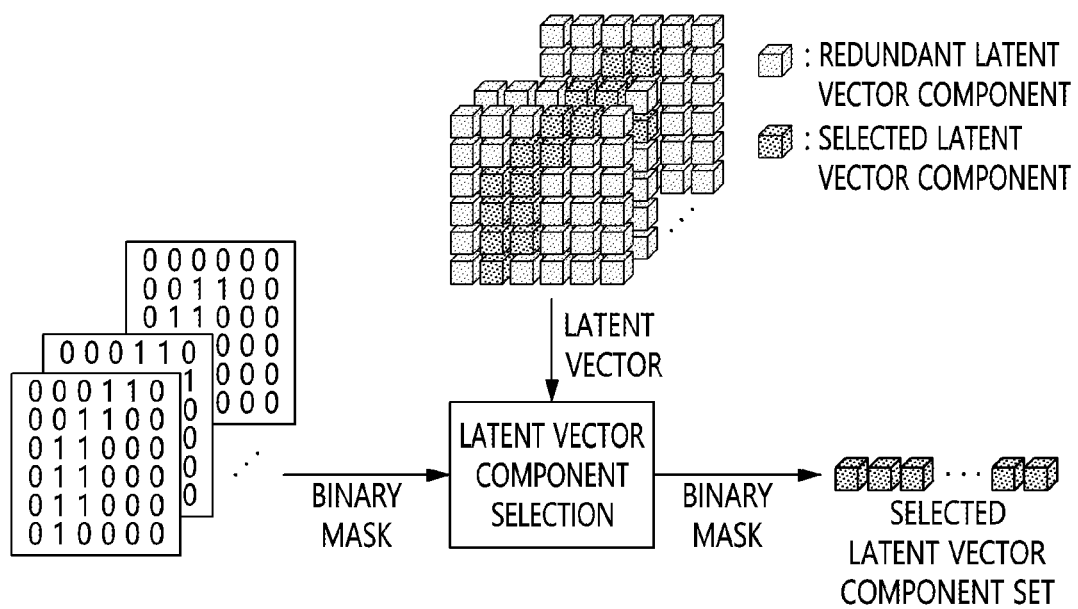
FIG. 5 illustrates the selection of a latent vector according to an example.

FIG. 5 illustrates the selection of a latent vector according to an example.

The latent vector selector 140 may select a latent vector component set from the latent vector using a binary mask.

The binary mask may include one or more active positions and one or more inactive positions.

On the left side of FIG. 5, a binary mask is illustrated. In the binary mask, active positions at which latent vector components are selected may be represented by "1". In the binary mask, inactive positions at which latent vector components are not selected may be represented by "0".

Each position in the binary mask may be one of an active position and an inactive position.

As illustrated in FIG. 5, the latent vector may be composed of n-dimensional latent vector components. For example, the latent vector may be composed of three-dimensional (3D) latent vector components.

The binary mask may indicate whether each of the n-dimensional latent vector components is selected. The binary mask may be composed of n-dimensional binary values.

The binary mask may be composed of binary values respectively corresponding to the latent vector components of the latent vector.

The latent vector components of the latent vector may include selected latent vector components and redundant latent vector components. Alternatively, each of the latent vector components of the latent vector may be one of a selected latent vector component and a redundant latent vector component.

Each selected latent vector component of the latent vector may be a latent vector component selected using the binary mask. Each redundant latent vector component of the latent vector may be a latent vector component that is not selected using the binary mask.

In other words, the value of the binary mask corresponding to the selected latent vector component may be "1". Additionally, the value of the mask corresponding to the redundant latent vector component may be "0".

Only latent vector components at positions indicated by "1" in the binary mask may be selected (or extracted) from among all latent vector components of the latent vector through the binary mask.

A selected latent vector component set may include extracted or selected latent vector components.

The number of selected latent vector components may be less than the total number of latent vector components of the latent vector. Therefore, the complexity of entropy encoding/entropy decoding on the selected latent vector components may be decreased.

Figure 6:
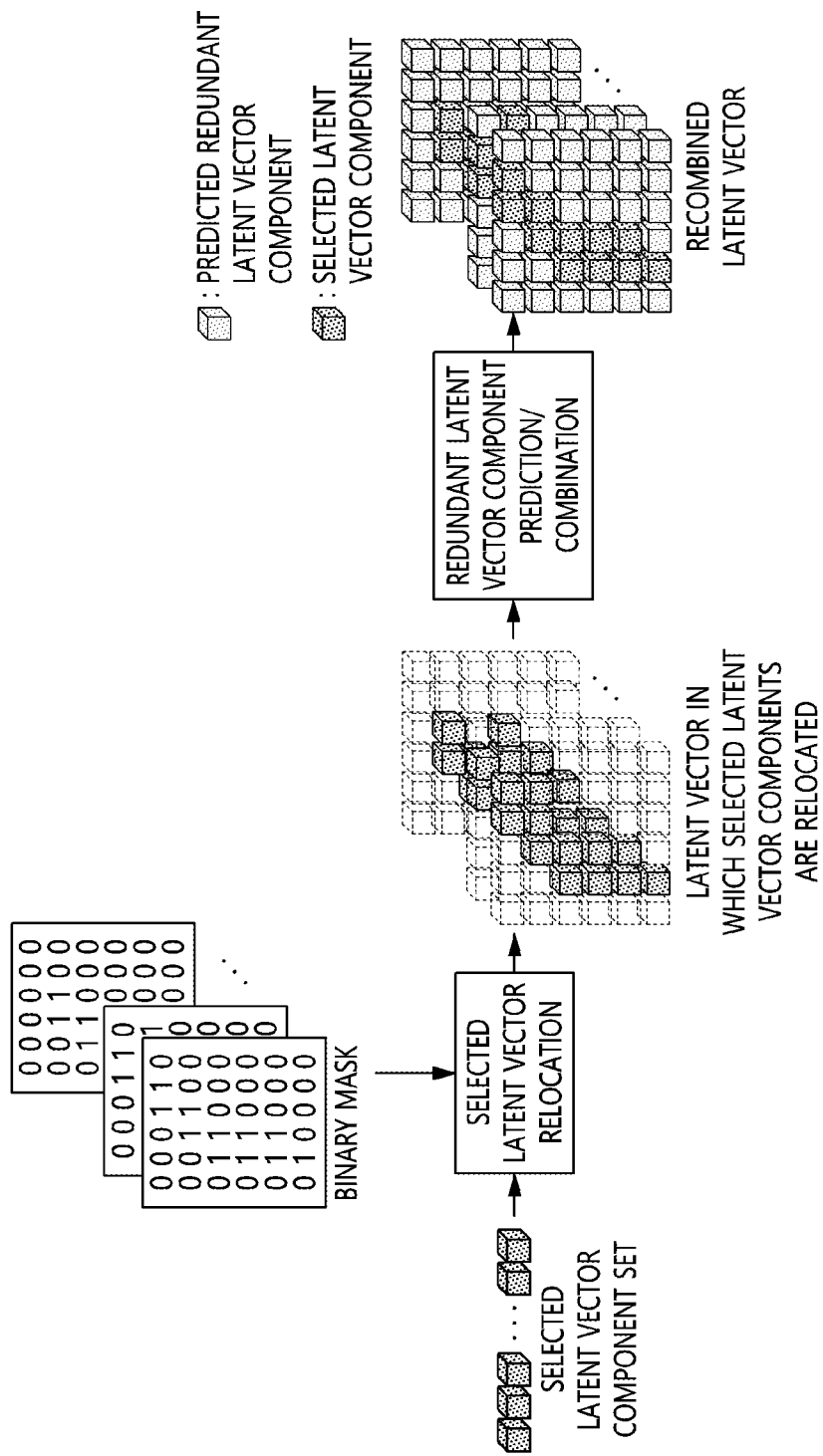
FIG. 6 illustrates a process for relocating selected latent vector components and predicting and combining redundant latent vector components according to an example.

FIG. 6 illustrates a process for relocating selected latent vector components and predicting and combining redundant latent vector components according to an example.

The latent vector component relocator 330 may generate a latent vector in which selected latent vector components are relocated by relocating a selected latent vector component set using a binary mask.

The redundant component predictor 340 may generate a recombined latent vector by performing prediction and combination on the redundant latent vector components of the latent vector.

The selected latent vector components of the selected latent vector component set that is reconstructed through entropy decoding may be arranged at one or more corresponding positions in the latent vector using one or more active positions specified in the binary mask.

Here, the corresponding positions may be positions in the latent vector from which the selected latent vector components have been extracted.

For example, the selected latent vector components in the reconstructed selected latent vector component set may be sequentially relocated at the active positions of the binary mask. Here, the order in which the selected latent vector components are arranged may be identical to the order in which the latent vector components are selected at step 240. In other words, the scheme by which the selected latent vector components are relocated may correspond to the scheme by which the above-described latent vector components are selected.

By means of the relocation corresponding to such selection, the selected latent vector components may be reconstructed at the original positions in the latent vector of the selected latent vector components.

After the relocation, the redundant component predictor 340 may determine the values of the remaining latent vector components, other than the relocated selected latent vector components, among all latent vector components of the latent vector. Here, the redundant latent vector components may be the remaining latent vector components, other than the relocated selected latent vector components, among (all) latent vector components of the latent vector.

In other words, the redundant component predictor 340 may determine the values of the redundant latent vector components in the latent vector. Alternatively, the redundant component predictor 340 may determine the values of the remaining latent vector components, other than the latent vector components filled with values due to the relocation of the selected latent vector components in the latent vector.

Because the redundant component predictor 340 does not know the correct values of the redundant latent vector components, prediction of the values of the redundant latent vector components may be performed, whereby the values of the redundant latent vector components may be determined.

The redundant component predictor 340 may use various prediction schemes for each of one or more redundant latent vector components.

For example, the redundant component predictor 340 may predict the value of each redundant latent vector component using one or more latent vector components neighboring the corresponding redundant latent vector component. The redundant component predictor 340 may predict the value of each redundant latent vector component using one or more relocated selected latent vector components neighboring the corresponding redundant latent vector component.

For example, the redundant component predictor 340 may predict the value of each redundant latent vector component using interpolation for the values of one or more latent vector components neighboring the corresponding redundant latent vector component. The redundant component predictor 340 may predict the value of each redundant latent vector component using interpolation for the values of relocated selected latent vector components neighboring the corresponding redundant latent vector component.

For example, the redundant component predictor 340 may predict the value of each redundant latent vector component using a specific function that exploits the values of one or more latent vector components neighboring the corresponding redundant latent vector component. The redundant component predictor 340 may predict the value of each redundant latent vector component using a specific function that exploits the values of relocated selected latent vector components neighboring the corresponding redundant latent vector component.

For example, an additional bitstream may include one or more prediction values for one or more redundant latent vector components. The redundant component predictor 340 may use the one or more prediction values extracted from the additional bitstream as one or more values of the redundant latent vector components, respectively.

For example, prediction may not be used, and the redundant component predictor 340 may use a specific value as the values of one or more redundant latent vector components. For example, the specific value may be "0", or may be any of other predefined values.

The number of selected latent vector components may be less than the total number of latent vector components of the latent vector. Therefore, the complexity of entropy encoding/entropy decoding on the selected latent vector components may be decreased.

Figure 7:
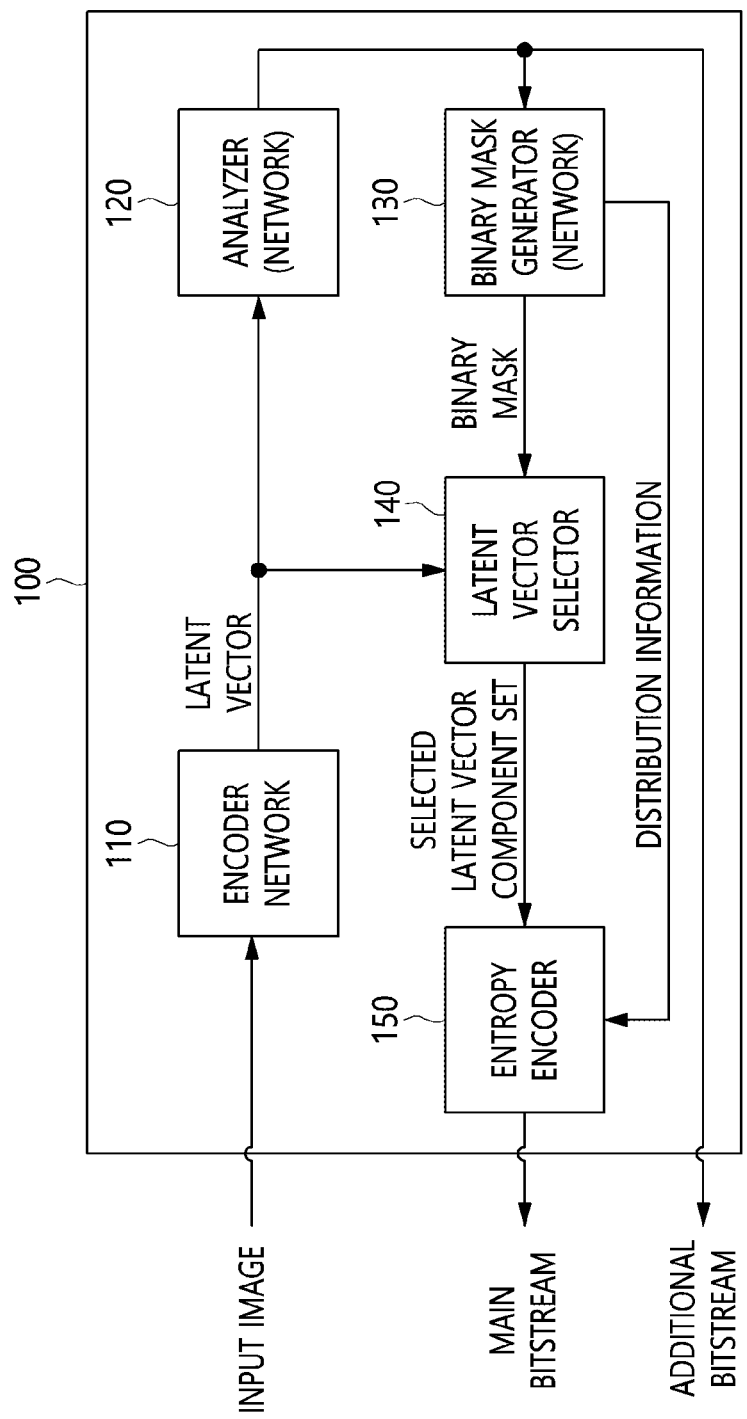
FIG. 7 illustrates an encoding apparatus using distribution information of a latent vector according to an example.

FIG. 7 illustrates an encoding apparatus using distribution information of a latent vector according to an example.

The encoding apparatus 100, described above with reference to FIG. 1 and other drawings, may use distribution information of the latent vector.

At step 220, described above with reference to FIG. 2, the analyzer 120 may generate the distribution information of the latent vector.

The distribution information of the latent vector may be information indicating the distribution of latent vector components of the latent vector.

The distribution information of the latent vector may vary depending on the distribution model to be used.

For example, assuming that the distribution of the latent vector components is a zero-mean Gaussian distribution, the distribution information may be a set of standard deviations.

For example, assuming that the distribution of the latent vector components is a standard Gaussian distribution, the distribution information may be a set of pairs of a mean and a standard deviation.

In other words, the distribution information may describe the independent distributions of the latent vector components of the latent vector.

The analyzer 120 may generate an additional bitstream including the distribution information. The additional bitstream may include distribution information or compressed distribution information.

The additional bitstream may be used 1) to compress and transmit information of a binary mask, and to compress and 2) to transmit the distribution information of the latent vector. One additional bitstream may be used 1) to compress and transmit the information of the binary mask, and 2) to compress and transmit the distribution information of the latent vector. Alternatively, two individual additional bitstreams may be separately used 1) to compress and transmit the information of the binary mask, and 2) to compress and transmit the distribution information of the latent vector.

At step 230, described above with reference to FIG. 2, the binary mask generator 130 may generate the binary mask and the distribution information of the latent vector using the additional bitstream.

The binary mask generator 130 may reconstruct the distribution information of the latent vector using compressed distribution information of the additional bitstream.

At step 250, described above with reference to FIG. 2, the entropy encoder 150 may generate a main bitstream by performing entropy encoding on the selected latent vector component set using the (reconstructed) distribution information.

The entropy encoder 150 may use the (reconstructed) distribution information to calculate a symbol probability for entropy encoding on selected latent vector components.

Figure 8:
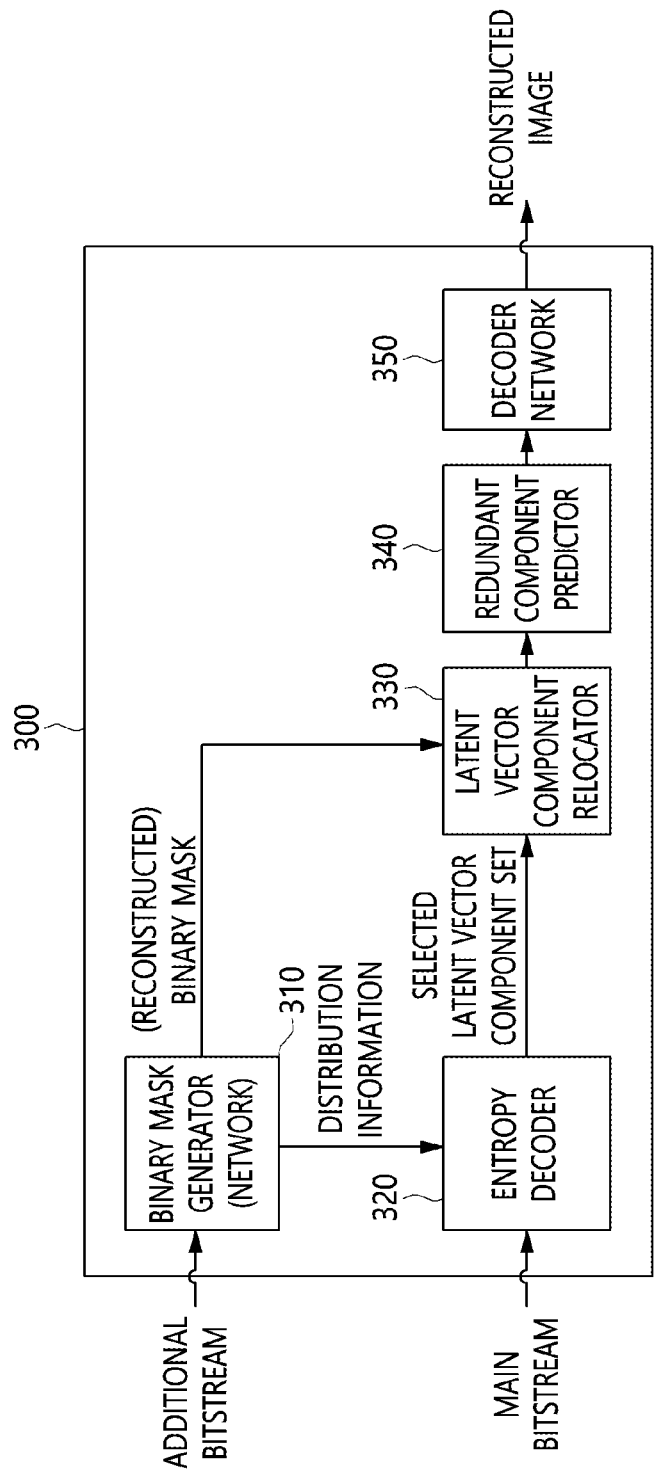
FIG. 8 illustrates a decoding apparatus using distribution information of a latent vector according to an example.

FIG. 8 illustrates a decoding apparatus using distribution information of a latent vector according to an example.

The decoding apparatus 300, described above with reference to FIG. 3 and other drawings, may use the distribution information of the latent vector.

At step 410, described above with reference to FIG. 4, the binary mask generator 310 may generate the distribution information of the latent vector using an additional bitstream.

The additional bitstream may include distribution information or compressed distribution information.

The binary mask generator 310 may reconstruct the distribution information using the compressed distribution information of the additional bitstream.

At step 420, described above with reference to FIG. 4, the entropy decoder 320 may generate a selected latent vector component set by performing entropy decoding on a main bitstream using the (reconstructed) distribution information.

The entropy decoder 320 may use the (reconstructed) distribution information to calculate a symbol probability for entropy decoding on one or more selected latent vector components.

The distribution information of the latent vector may vary depending on the distribution model to be used.

For example, assuming that the distribution of the latent vector components is a zero-mean Gaussian distribution, the distribution information may be a set of standard deviation values.

For example, assuming that the distribution of the latent vector components is a standard Gaussian distribution, the distribution information may be a set of pairs of a mean and a standard deviation.

The pairs of pieces of distribution information may respectively correspond to the latent vector components of the latent vector.

Figure 9:
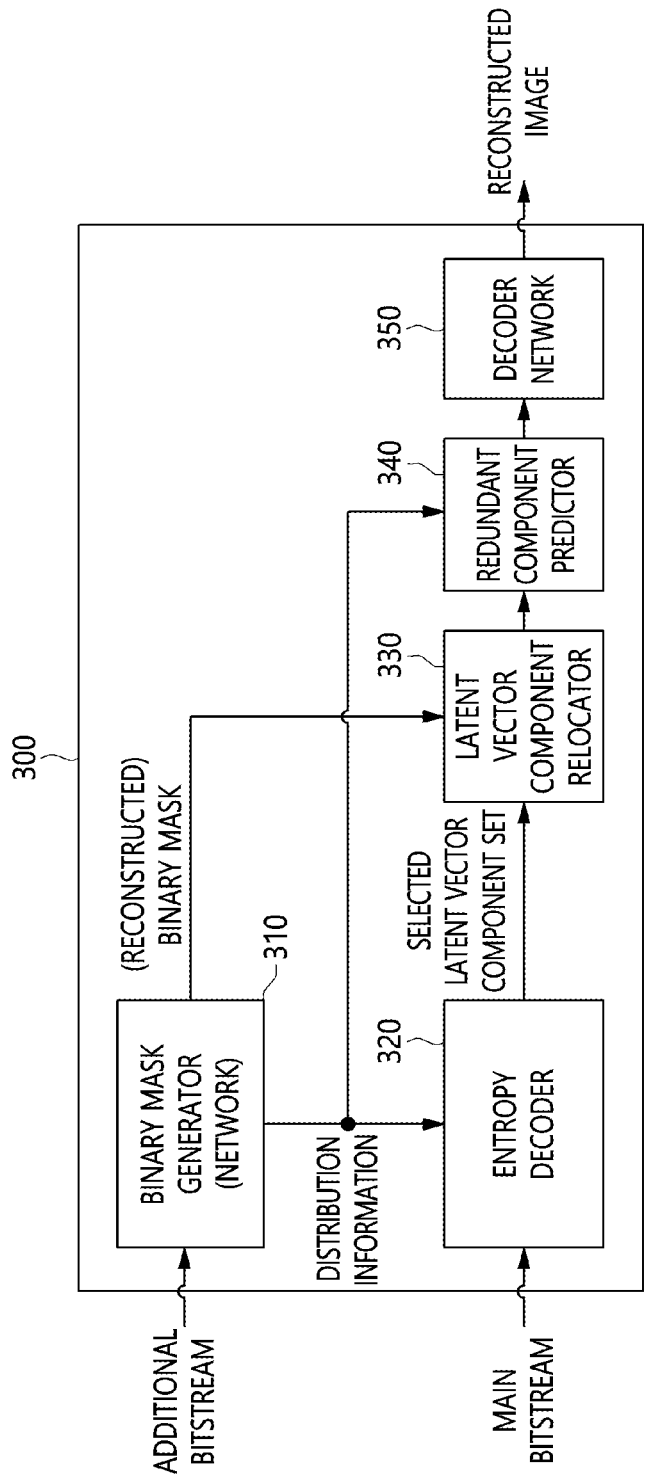
FIG. 9 illustrates a decoding apparatus that uses distribution information of a latent vector for prediction of a redundant latent vector component according to an example.

FIG. 9 illustrates a decoding apparatus that uses the distribution information of a latent vector for prediction of a redundant latent vector component according to an example.

The decoding apparatus 300, described above with reference to FIG. 3 and other drawings, may use the distribution information of the latent vector.

At step 410, described above with reference to FIG. 4, the binary mask generator 310 may generate the distribution information of the latent vector using an additional bitstream.

The additional bitstream may include distribution information or compressed distribution information.

The binary mask generator 310 may reconstruct the distribution information using the compressed distribution information of the additional bitstream.

At step 420, described above with reference to FIG. 4, the entropy decoder 320 may generate a selected latent vector component set by performing entropy decoding on a main bitstream using the (reconstructed) distribution information.

The entropy decoder 320 may use the (reconstructed) distribution information to calculate a symbol probability for entropy decoding on selected latent vector components.

At step 440, described above with reference to FIG. 4, the redundant component predictor 340 may perform prediction of one or more redundant latent vector components of the latent vector using (reconstructed) distribution information.

For example, the distribution information of the latent vector may be a set of pairs of a mean and a standard deviation, and may describe the distribution of each of the latent vector components of the latent vector. In this case, the mean value of the redundant latent vector component indicated by the distribution information of the latent vector may be used as a prediction value for the redundant latent vector component.

Figure 10:
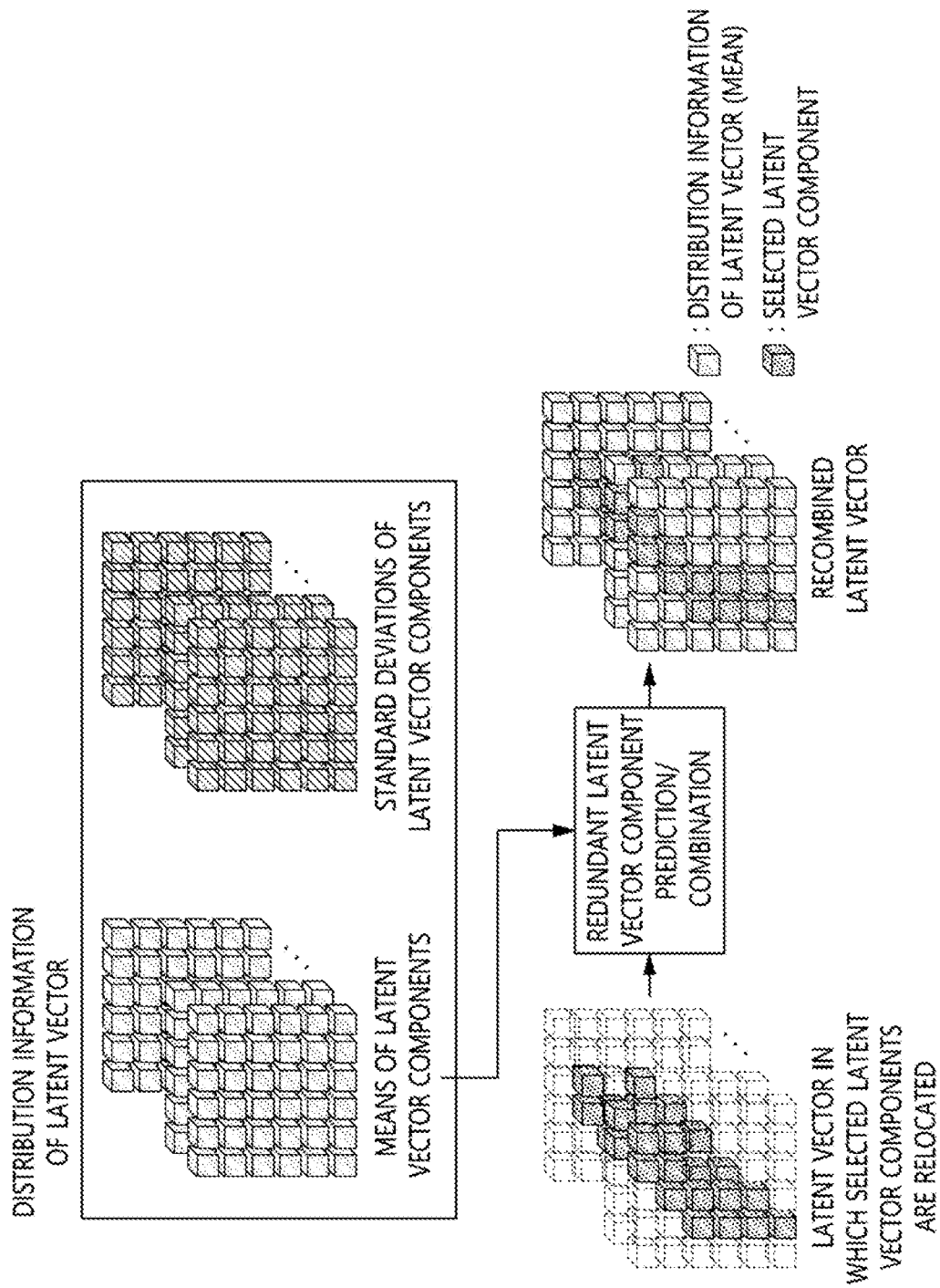
FIG. 10 illustrates prediction of a redundant latent vector component using distribution information of a latent vector according to an example.

FIG. 10 illustrates prediction of a redundant latent vector component using distribution information of a latent vector according to an example.

As described above, the distribution information of the latent vector may include a mean and a standard deviation of each of latent vector components of the latent vector.

In other words, the distribution information of the latent vector may include means and standard deviations of the latent vector components of the latent vector.

Upon determining the values of the remaining latent vector components, other than relocated selected latent vector components, among all latent vector components of the latent vector, the redundant component predictor 340 may use the distribution information of the latent vector. Here, the remaining latent vector components may be redundant latent vector components.

Upon determining the values of the remaining latent vector components, other than the relocated selected latent vector components, among all latent vector components of the latent vector, the redundant component predictor 340 may use mean values of the distribution information.

Upon predicting the value of a corresponding redundant latent vector component of the latent vector, the redundant component predictor 340 may use the mean value of distribution information corresponding to the redundant latent vector component as the value of the redundant latent vector component.

In the above-described embodiments, the network may be a neural network.

The network may perform learning. When the network performs learning, a loss function may be used.

The loss function may be formed as a combination of a rate term and a distortion term.

In a conventional scheme, the probability of each component value is calculated using a learnable probability distribution function, and the rate term is calculated based on the probability of each component value. For example, on the assumption that the distribution of each component is a Gaussian distribution, the mean and the standard deviation of each component may be learned. Alternatively, a separated compression/reconstruction network that predicts the mean and the standard deviation of each latent vector component, instead of learning the mean and the standard deviation of each latent vector component, may be trained. For example, as described above, the distribution information of the latent vector may be generated by a separate network.

In an embodiment, upon calculating the rate term, the rate term may not be calculated for all latent vector components of the latent vector. Upon calculating the rate term, the rate term may be calculated for latent vector components selected using the binary mask, among the latent vector components of the latent vector.

For example, when the latent vector components selected through the binary mask are 10% of all latent vector components, rates can be calculated only for the 10% latent vector components, and the rate term may be calculated by adding the calculated rates.

The loss function may be defined by the following Equation (1):

$$\text{loss function} = R1\,(\text{mask}(\text{latent vector})) + R2\,(\text{additional information } n) + D(\text{original}, DN\,(\text{recombined latent vector})) \quad (1)$$

Here, "R1 (mask (latent vector)+R2 (additional information)" may correspond to the rate term. "D (original, DN (recombined latent vector)" may correspond to the distortion term.

"R1 (mask (latent vector)" may indicate the rate for the selected latent vector components.

Function mask( ) may indicate the application of the binary mask.

Function R( ) may indicate a rate term calculation function. Because rate calculation methods for the latent vector and the additional information may differ from each other, function R1( ) for the latent vector and function R2( ) for the additional information may be separately displayed.

Function DN( ) may indicate the procedure for deriving a reconstructed image from a latent vector recombined through a decoder network.

Function D( ) may indicate a distortion calculation function between the reconstructed image and the original image.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, a method, and a storage medium for selecting latent vector components of a latent vector using a binary mask.

There are provided an apparatus, a method, and a storage medium for performing encoding/decoding on a latent vector using distribution information of the latent vector.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
generating a latent vector using an input image;
generating a selected latent vector component set using the latent vector; and
generating a main bitstream by performing entropy encoding on the selected latent vector component set, wherein
the main bitstream comprises information to generate a reconstructed image,
the reconstructed image is generated using a recombined latent vector which is generated by determining values of one or more redundant latent vector components of the latent vector, and
the one or more redundant latent vector components are remaining latent vector components, other than the selected latent vector components, among all latent vector components of the latent vector.

2. The encoding method of claim 1, further comprising:
generating an additional bitstream by performing analysis and compression on the latent vector; and
generating a binary mask using the additional bitstream-, wherein
the selected latent vector component set is generated using the binary mask.

3. The encoding method of claim 1, wherein;
the selected latent vector component set is generated using a binary mask, and
the binary mask includes binary values respectively corresponding to latent vector components of the latent vector.

4. The encoding method of claim 3, wherein:
each of the latent vector components of the latent vector is one of a selected latent vector component and a redundant latent vector component,
the selected latent vector component is a latent vector component that is selected using the binary mask, and
the redundant latent vector component is a latent vector component that is not selected using the binary mask.

5. The encoding method of claim 1, wherein the main bitstream is generated by performing the entropy encoding on the selected latent vector component set using distribution information.

6. The encoding method of claim 5, wherein the distribution information is used to calculate a symbol probability for the entropy encoding on the selected latent vector component set.

7. The encoding method of claim 5, wherein the distribution information is a set of pairs of a mean and a standard deviation.

8. A decoding method, comprising:
generating a selected latent vector component set including one or more selected latent vector components by performing entropy decoding on a main bitstream;
generating a latent vector in which the one or more selected latent vector components are relocated by relocating the selected latent vector component set in the latent vector;
generating a recombined latent vector by determining values of one or more redundant latent vector components of the latent vector; and
generating a reconstructed image using the recombined latent vector,
wherein the one or more redundant latent vector components are remaining latent vector components, other than the selected latent vector components, among all latent vector components of the latent vector.

9. The decoding method of claim 8, further comprising:
generating a binary mask using an additional bitstream,
wherein relocation of the selected latent vector component set in the latent vector is performed using the binary mask.

10. The decoding method of claim 9, wherein the selected latent vector components are arranged at one or more corresponding positions in the latent vector using one or more active positions specified in the binary mask.

11. The decoding method of claim 9, wherein:
distribution information of the latent vector is generated using the additional bitstream, and
the distribution information is used to calculate a symbol probability for entropy decoding on one or more selected latent vector components of the selected latent vector component set.

12. The decoding method of claim 11, wherein the distribution information is a set of pairs of a mean and a standard deviation.

13. The decoding method of claim 11, wherein prediction of the one or more redundant latent vector components of the latent vector is performed using the distribution information.

14. The decoding method of claim 8, wherein a value of each of the one or more redundant latent vector components is predicted using one or more latent vector components neighboring the corresponding redundant latent vector component.

15. The decoding method of claim 8, wherein a value of each of the one or more redundant latent vector components is predicted using one or more relocated selected latent vector components neighboring the corresponding redundant latent vector component.

16. The decoding method of claim 8, wherein a value of each of the one or more redundant latent vector components is predicted using interpolation for values of one or more latent vector components neighboring the corresponding redundant latent vector component.

17. The decoding method of claim 8, wherein:
a binary mask is generated using an additional bitstream,
the additional bitstream includes one or more prediction values for the one or more redundant latent vector components, and
the one or more prediction values are used as one or more values of the one or more redundant latent vector components, respectively.

18. The decoding method of claim 8, wherein a specific value is used as values of the one or more redundant latent vector components.

19. A non-transitory computer-readable storage medium storing a bitstream for encoding, the bitstream comprising:
a main bitstream;
wherein a selected latent vector component set including one or more selected latent vector components is generated by performing entropy decoding on the main bitstream,
wherein a latent vector in which the one or more selected latent vector components are relocated is generated by relocating the selected latent vector component set in the latent vector,
wherein a recombined latent vector is generated by determining values of one or more redundant latent vector components of the latent vector,
wherein a reconstructed image is generated using the recombined latent vector, and
wherein the one or more redundant latent vector components are remaining latent vector components, other than the selected latent vector components, among all latent vector components of the latent vector.

20. The non-transitory computer-readable storage medium of claim 19, wherein:
the bitstream further comprising:
an additional bitstream,
wherein a binary mask is generated using the additional bitstream, and
wherein relocation of the selected latent vector component set in the latent vector is performed using the binary mask.

* * * * *